United States Patent [19]
Warner et al.

[11] Patent Number: 5,119,365
[45] Date of Patent: Jun. 2, 1992

[54] BI-DIRECTIONAL BUFFER LINE AMPLIFIER

[75] Inventors: Michael Warner, Phoenix, Ariz.; Don H. Scrutchfield, Austin, Tex.

[73] Assignee: AG Communication Systems Corporation, Phoenix, Ariz.

[21] Appl. No.: 627,274

[22] Filed: Dec. 14, 1990

[51] Int. Cl.$^5$ .............................................. H04J 15/00
[52] U.S. Cl. ....................................... 370/32; 379/404
[58] Field of Search ..................... 370/32, 24; 379/404, 379/400, 401, 67

[56] References Cited

U.S. PATENT DOCUMENTS

| | | | |
|---|---|---|---|
| 3,883,864 | 5/1975 | Thomas | 375/25 |
| 4,480,251 | 10/1984 | McNaughton | 379/26 |
| 4,837,818 | 6/1989 | Pieters | 379/382 |
| 4,980,908 | 12/1990 | Yu | 379/67 |

Primary Examiner—Douglas W. Olms
Assistant Examiner—T. Samuel
Attorney, Agent, or Firm—Gregory G. Hendricks

[57] ABSTRACT

An improved bi-directional buffer line amplifier is disclosed that provides a high performance analog interface between a Digital Network Interface Circuit (DNIC) and a transmission line. The buffer line amplifier includes a transmit amplifier network including an input connected to a DNIC transmit signal output. The input is arranged to receive transmit signals from the DNIC. A transmit output is connected to a matching network via a selectable gain amplifying circuit. The selectable gain amplifying circuit applies the transmit signals to the matching network in a first or a second gain level. In the first gain level the gain amplifying circuit is removed from the transmit amplifier network and the transmit amplifier network operates as a unity gain amplifier. This allows the buffer line amplifier to work efficiently with transmission line loop lengths from zero to a nominal distance. In the second gain level the gain amplifying circuit is connected in series between the transmit amplifier network and the matching network, thereby, significantly amplifying the transmit signals. This allows the buffer line amplifier to work efficiently with transmission line loop lengths of a substantially greater distance than the nominal distance. A receive amplifier network is also included that cancels the transmit signals from receive signals. This provides the necessary phase error cancellation required by the DNIC for the error free reception of the receive signals.

4 Claims, 1 Drawing Sheet

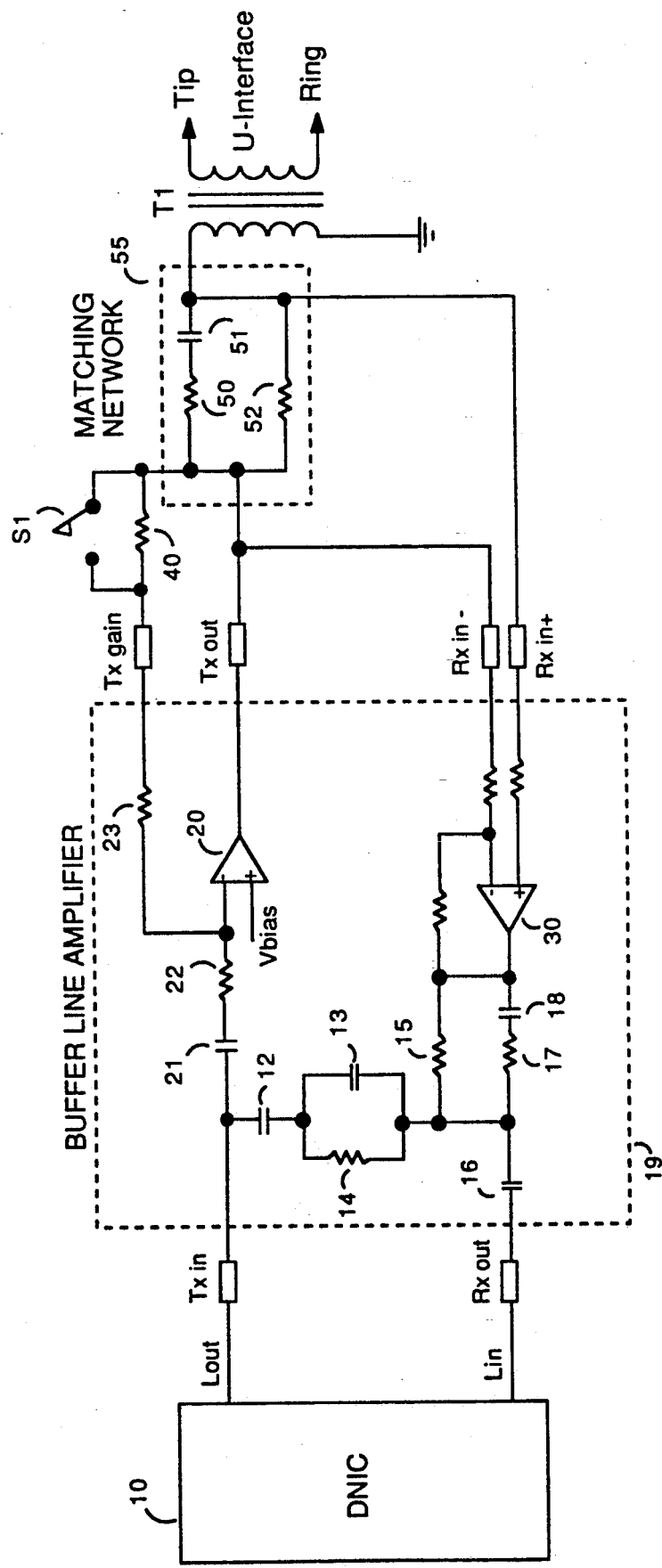

BI-DIRECTIONAL BUFFER LINE AMPLIFIER

BACKGROUND OF THE INVENTION

1. Field of the Invention

The present invention relates in general to the field of telecommunications, and more particularly, to an improved bi-directional buffer line amplifier for use with a U-interface Basic Rate ISDN (Integrated Services Digital Network).

2. Description of the Prior Art

Modern digital telecommunication systems have operating requirements that interface their digital operation to an analog transmission environment. Many such systems use a Digital Network Interface Circuit (DNIC) device to interface a digitally operating system to an analog transmission line. The DNIC is capable of providing high speed, full duplex digital transmission up to 160 kbit/s over a standard analog twisted wire pair. Further, the DNIC uses adaptive echo-cancelling techniques that transfers data in a (2B+D) format compatible to the ISDN basic rate. Such devices are ideal for providing the "U" interface point in an ISDN application.

Such devices are used in "smart" telephone instruments that have both a voice and data capability. Within such a telephone instrument the DNIC would terminate the line and encode/decode the data and voice for transmission. Additional electronics could provide interfaces for a standard telephone instrument and any number of data ports supporting standard data rates for such things as computer communications. One such device is the MT8972 DNIC, manufactured by the MITEL ® Corporation.

The design of the analog interface between the DNIC and the transmission line is a difficult problem due to a concession between two issues. The first issue, is the design of a network of components, connected via a transformer, that provide the necessary near-end cancellation of the transmitted signal. The cancellation must be designed for transmission line loop lengths from zero to a large distance, and for 22, 24 and 26 gauge cable. The second issue, is the design of an intentional phase error in the near-end cancellation to meet a required one-half sampling clock within the DNIC. Thereby, allowing the DNIC to internally cancel correctly.

The solution to the above issues achieves a circuit that functions correctly for only moderate transmission line loop lengths, nonetheless, many customers require extended ranges for their particular applications.

In these cases, loop extender circuits are used to extend the operating range or the transmission line length over which the DNIC may operate efficiently. These loop extender circuits are found between the DNIC and the transmission line and basically combine signal equalization and amplification for the receive and transmit paths of the DNIC. One such device is the MH89726/728, manufactured by the MITEL ® Corporation. However, a major problem with the loop extender circuits is that they can not be used for zero or near transmission line loop lengths. In the *MICROELECTRONICS DIGITAL COMMUNICATIONS HANDBOOK*, issue seven, by the MITEL ® Corporation, application sheet MSAS-46, FIG. 2, page 15-11, suggests the use of three switches or jumpers to connect or bypass the loop extender circuit depending on the loop length to be achieved. The problem with this method is that, to correctly design a circuit to include the compromise issues discussed above would require also changing the electronic network components, that is, a clock correction to meet the one-half sampling clock requirement for long loops and no-clock correction for near loops.

Accordingly, it is an object of the present invention to provide an improved bi-directional buffer line amplifier that will perform efficiently with transmission lines that have loop lengths ranging from zero to a long range, with no data transmission errors.

SUMMARY OF THE INVENTION

The above and other objects, advantages, and capabilities are realized in an improved bi-directional buffer line amplifier used in interfacing an analog transmission line to a Digital Network Interface Circuit (DNIC). The bi-directional buffer line amplifier includes a transformer connecting a transmission line to the buffer line amplifier, and a matching network that matches the buffer line amplifier to the impedance of the transmission line.

The buffer line amplifier further includes a transmit amplifier network including an input connected to a DNIC transmit signal output. The input is arranged to receive transmit signals from the DNIC. A transmit output is connected to the matching network via selectable gain amplifying circuit. The selectable gain amplifying circuit is arranged to apply the transmit signals to the matching network in a first gain level or alternatively, a second gain level.

In the first gain level, the gain amplifying circuit is removed from the transmit amplifier network and the transmit amplifier network operates as a unity gain amplifier. In this configuration, the matching network via the transformer, couples the transmit signals to the transmission line. The first gain level allows the buffer line amplifier to work efficiently with transmission line loop lengths from zero to a nominal distance.

In the second gain level, the gain amplifying circuit is connected in series between the transmit amplifier network and the matching network, thereby, significantly amplifying the transmit signals. In this configuration, the matching network via the transformer couples the amplified transmit signals to the transmission line. The second gain level allows the buffer line amplifier to work efficiently with transmission line loop lengths of a substantially greater distance than the nominal distance.

The bi-directional buffer line amplifier further includes a receive amplifier network. The receive amplifier network includes a first input connected to the transmit amplifier network output and a second input connected to the matching network. The receive amplifier network first input receives the transmit signals from the transmit amplifier network output and the second input receives, receive signals transmitted on the transmission line. The receive amplifier network cancels the transmit signals from the receive signals and connects the receive signals to the receive signal input of the DNIC. This provides the necessary phase error cancellation required by the DNIC for the error free reception of the receive signals.

BRIEF DESCRIPTION OF THE DRAWINGS

A better understanding of the invention may be had from the consideration of the following detailed description taken in conjunction with the single sheet of drawings included herewith, illustrating the improved bidirectional buffer line amplifier in accordance with the present invention.

DESCRIPTION OF A PREFERRED EMBODIMENT

The present invention is an improved bi-directional buffer line amplifier that provides a high performance analog interface between a Digital Network Interface Circuit (DNIC) and an outside transmission line. The buffer line amplifier operates with transmission lines having 24 and 26 gauge cable and of various lengths.

Turning now to the single sheet of drawings the following major components of the present invention are illustrated. A DNIC 10 is connected to a bi-directional buffer line amplifier or Buffer Line Amplifier 19. The Buffer Line Amplifier 19 is further connected to a Matching Network 55 and to a gain resistor 40 and shorting switch S1. The Matching Network 55 is further connected to the tip and ring leads of a communication transmission line via transformer T1.

Within the Buffer Line Amplifier 19, the RC network consisting of capacitors 12, 13, 16 and 18 and resistors 14, 15 and 17 provide the necessary gain and phase delay to interact with the received signal. This interaction causes the DNIC 10 to cancel the transmitted signal correctly. Further, any changes at the U-interface point will not alter this cancellation behavior, since the impedances between the Tx and Rx connections are constant.

The Transmit amplifier comprising capacitor 21, resistor 22, operational amplifier 20, and resistor 23 is configured as a unity gain amplifier when gain resistor 40 is shorted. Resistor 40 is shorted by closing switch S1. This connects Tx gain directly to Tx out and buffers the transmitted signal from the DNIC 10.

The Matching Network 55 consists of resistors 50 and 52 and capacitor 51. The components of the Matching Network 55 are selected to provide an optimal balance such that the receive side of the Buffer Line Amplifier 19 cancels the transmitted side effectively. The gain of the receive amplifier is structured so that when the signal at Rx in+ input is one-half and in phase with the signal at the Rx in− input, the transmitted signal (signal from Tx out) is completely cancelled leaving only the received signal at the Rx in+ input to pass through the receive amplifier to the DNIC 10.

The values and topology of the Matching Network 55 components is designed uniquely for the specific transformer T1 used. The Matching Network 55 must be reevaluated for each transformer designed in this application. Transformer T1 must exhibit a low leakage inductance, and is generally a low DCR broadband transformer.

Due to the isolation between the near-end cancellation at the DNIC and the cancellation at the transformer T1, the design at the DNIC is constant. This requires only a design effort at the transformer for the specific transformer, cable or frequency requirements of the transmission line.

With switch S1 closed and gain resistor 40 shorted the buffer line amplifier 19 interfaces the transmission line to the DNIC 10 for loop lengths from zero distance to a nominal short loop range. In the event that an extended transmission line loop length is required, switch S1 is opened applying gain resistor 40 between the Tx gain and Tx out outputs of Buffer Line Amplifier 19. The value of resistor 40 is that value which is determined to be effective for the loop range required. The Matching Network 55 is optimized to function efficiently with gain resistor 40 and will allow a possible 10 dB gain in the transmitted signal for achieving long loop ranges. Therefore, S1 in combination with resistor 40 allow buffer line amplifier 19 to provide an analog interface for zero to short loop lengths and for long loop lengths.

The present invention as described above is a unique circuit device which can be electrically altered to operate within short and long transmission line loop lengths. By using a Buffer Line Amplifier with unity gain, an interface can be designed between the DNIC and the buffer to satisfy the one-clock sampling problem with no effect on the various cable conditions. Further, a matching network can be designed that is solely dependent on the conditions of the transmission line, such as length and cable type. This allows more freedom in designing a transformer and matching network that is more consistent in manufacturing and which maintains a high degree of circuit performance. Finally, the gain of the Buffer Line Amplifier can be easily altered by the switching in or out of a single resistor. The addition of a gain resistor of a specific value allows for a higher transmit level, and therefore, operation of the buffer line amplifier in long transmission line loop ranges. The removal of the gain resistor allows the same Buffer Line Amplifier to operate effectively in loop lengths of zero distance to a nominal short loop range with no errors.

It will be obvious to those skilled in the art that numerous modifications to the present invention can be made without departing from the scope of the invention as defined by the appended claims. In this context, it should be recognized that the essence of the invention resides in a new and improved bi-directional buffer line amplifier that performs efficiently in various transmission line loop lengths.

What is claimed is:

1. A circuit arrangement for interfacing an analog transmission line to a Digital Network Interface Circuit (DNIC), said DNIC including a transmit signal output and a receive signal input, said circuit arrangement comprising:

magnetic coupling means connecting said transmission line to said circuit arrangement;

matching network means connected to said magnetic coupling means for impedance matching the circuit arrangement to said transmission line;

a transmit amplifier network including an input connected to said DNIC transmit signal output and arranged to receive transmit signals from said DNIC, and an output connected to said matching network via selectable gain amplifying means, said selectable gain amplifying means arranged to apply said transmit signals to said matching network in a first gain level or alternatively a second gain level;

in said first gain level said gain amplifying means is removed from said transmit amplifier network and said transmit amplifier network operates as a unity gain amplifier, and said matching network via said magnetic coupling means applies said transmit signals to said transmission line having a transmission line loop length from zero to a nominal distance; and in said second gain level said gain amplifying means is connected in series between said transmit amplifier network and said matching network amplifying said transmit signals, and said matching network via said magnetic coupling means applies said amplified transmit signals to said transmission line having a transmission line loop length of a substantially greater distance than said nominal distance.

2. The circuit arrangement as claimed in claim 1, wherein said circuit arrangement further includes a receive amplifier network, said receive amplifier network having a first input connected to said transmit amplifier network output and a second input connected to said matching network, said receive amplifier network first input arranged to receive said transmit signals and said receive amplifier network second input arranged to receive signals transmitted on said transmission line, whereby, said receive amplifier network cancels said transmit signals from said receive signals and connects said receive signals to said receive signal input of said DNIC.

3. The circuit arrangement as claimed in claim 2, wherein said selectable gain amplifying means includes a resistor connected between said transmit amplifying network output and said matching network means and a shorting device connected across said resistor and selectable into a first or alternatively a second position, whereby, in said first position said shorting device is enabled, electrically removing said resistor from said circuit arrangement, allowing said transmit amplifier means to operate in said first gain level.

4. The circuit arrangement as claimed in claim 3, wherein, in said second position said shorting device is disabled, electrically inserting said resistor between said transmit amplifier network and said matching network, allowing said transmit amplifier means to operate in said second gain level.

* * * * *